United States Patent [19]
Onishi

[11] Patent Number: 5,834,117
[45] Date of Patent: Nov. 10, 1998

[54] HEAT-RESISTANT ELECTRICAL WIRE COMPRISING A BENZIMIDAZOLE-BASED POLYMER COATING

[75] Inventor: Yasuhiko Onishi, Yokkaichi, Japan

[73] Assignee: Sumitomo Wiring Systems, Ltd., Japan

[21] Appl. No.: 747,540

[22] Filed: Nov. 12, 1996

[30] Foreign Application Priority Data

Nov. 13, 1995 [JP] Japan ................................ 7-294234

[51] Int. Cl.$^6$ ................................................ B32B 15/00
[52] U.S. Cl. .................. 428/379; 29/828; 174/110 A; 174/110 R; 174/120 R; 427/117; 427/118; 427/356; 428/380; 428/384; 428/389
[58] Field of Search ............................. 29/828; 427/117, 427/118, 356; 428/379, 380, 384, 389; 174/110 A, 110 R, 120 R

[56] References Cited

U.S. PATENT DOCUMENTS 5,468,557  11/1995  Nishio et al. .......................... 428/384
5,477,610  12/1995  Sawada et al. ......................... 29/828

FOREIGN PATENT DOCUMENTS

0566148A1  10/1993  European Pat. Off. .

*Primary Examiner*—Terressa Mosley
*Attorney, Agent, or Firm*—Jordan B. Bierman; Bierman, Muserlian and Lucas

[57] ABSTRACT

A heat-resistant combination including a substrate, a first layer, and a second layer. The first layer includes a benzisidazole-based polymer with a first face in contact with the substrate; and the second layer contains a ceramic material and is securely fixed to a second face of said first layer.

7 Claims, 2 Drawing Sheets

HEAT-RESISTANT ELECTRICAL WIRE COMPRISING A BENZIMIDAZOLE-BASED POLYMER COATING

The present Invention relates to a heat-resistant electrical wire and a heat-resistant insulating material which can be used independently of the wire. This material can be applied, for example, to an enameled electrical wire which is required to have a high heat resistance. The Invention relates also to a method of manufacturing such a heat-resistant electrical wire and the use thereof.

BACKGROUND OF THE INVENTION

There already exist heat-resistant electrical wires such as polyimide coated wires, enameled wires, and highly heat-resistant cemented enameled wires. However, the maximum temperatures of use for such wires are respectively 250° C., 150° to 220° C., and 220° C., the temperature limit being therefore 250° C. at the most.

Therefore, there is currently research into a heat-resistant electrical wire having higher heat resistance, i.e. resistant to temperatures above 250° C. The present inventors have already developed an electrical wire coated with a film obtainable by reacting benzimidazole-based polymers (hereinafter referred to as PBI) and which is described in Japanese patent application Heisei 4-124342. In this application, PBI having high heat resistance was applied on an exposed electrical wire or an electrical wire covered with insulating coatings, and the polymer was then baked to form a PBI film.

Such PBI coated electrical wire has a high heat resistance, showing a softening temperature at temperatures above 350° C. However, at high temperature, it tends to be partially oxidized by air, so that, depending on the conditions of use, such a coated wire cannot yield the full advantages Of its heat resistance, voltage resistance, flexibility, and other features.

SUMMARY OF THE INVENTION

It is therefore an object of the present Invention to improve the above-mentioned PBI film-coated electrical wire or the like, and to obtain a heat-resistant electrical wire or insulating material that fully displays the advantageous characteristics, such as high heat resistance, inherent in PBI. It in another object of the Invention to provide methods of use of such electrical wires of insulating materials, as well as a manufacturing process therefor.

To this end, the Invention provides a heat-resistant insulating material comprising a first layer of a benzimidazole-based polymer, the layer having a first face confronting an electrically conductive element. A second layer containing a ceramic material is securely fixed to the second face of the first layer. The second layer may also include an organic or inorganic silicon-containing compound.

The benzimidazole-based polymers or the present Invention are reaction products of a plurality of benzimidazole-based polymers of in Formula I

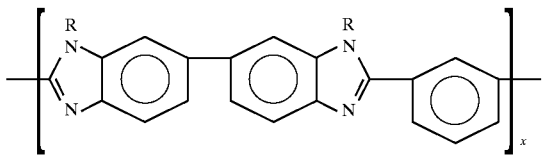

wherein R is selected from the group consisting or hydrogen and alkyl having 1 to 4 carbon atoms, and x is an integer of at least 5 and chosen to yield solvent-soluble polymers. x may be the same or different for each of the plurality of polymers and its maximum value is usually about 3,500 (hereinafter the Inventive Polymer).

The ceramic material in the second layer is preferably represented by Formula II $$M_k O_l \qquad \mathrm{II}$$

wherein M is metal, k is 1 or 2, and l is 1, 2, or 3.

The heat-resistant insulating material of the Invention may contain simultaneously a first layer comprised of the Inventive Polymer and a second layer of the ceramic material of Formula II. The element containing an electrically conductive part may be either an electrical wire or an electrical wire coated with an insulating layer.

The Invention is also directed to a heat-resistant electrical wire having an electrically conductive wire portion, a first coating of the Inventive Polymer surrounding the wire portion, and a second coating containing the ceramic material surrounding the Inventive Polymer coating. All of the components, i.e. the wire portion and the two coatings, are securely fixed to each other. The ceramic coating may also include an organic or inorganic silicon-containing compound.

In a preferred embodiment, the electrical wire combines the first coating containing Inventive Polymer with the second coating containing the ceramic material of Formula II. The wire portion is advantageously an electrical wire which may be coated with an insulating layer.

Further, the present invention provides a method or manufacturing the resistant insulating material comprising
a) preparing a varnish solution containing a plurality of the Inventive Polymers,
b) applying the solution to a face of the element having an electrically conductive part,
c) reacting the Inventive Polymers, thereby obtaining the first layer having the first and second faces;
d) coating the second face of the first layer with the second layer comprised of the ceramic material, so that it is secured to the first layer; and
e) baking the first coating with the second coating.

The corresponding heat-resistant electrical wire is produced by the same method when the electrically conductive part is a wire. If desired, the varnish solution may be applied a plurality of times, thereby providing a multilayer wire which has been reinforced.

The earlier coating(s) are, in turn, covered by the ceramic material, and secured thereto. The second coating may be reinforced by applying the ceramic varnish solution to the wire portion covered with the first coating, baking the ceramic varnish solution, and repeating the application and baking.

Preferably, the varnish solution is prepared from the ceramic material and an organic silicon-containing compound. Alternatively, the ceramic layer may be formed by preparing a paste containing the ceramic material and extruding it around the first coating. The paste may also include an inorganic silicon-containing compound.

A radical-polymerization initiating agent may be added to the solution in step a), especially if the plurality of benzimidazole-based Inventive Polymer has a low degree of polymerization. In one embodiment, the second coating may consist mainly in preparing a varnish solution containing at least the ceramic material, applying the ceramic varnish solution to the wire portion covered by the first coating, baking the ceramic varnish solution, and repeating, where appropriate, the application and baking.

The heat-resistant electrical wire thus manufactured may be used in electrical circuitry for an aircraft, for high voltage cables, communications applications, electrical heaters, or similar applications which require high heat resistance.

BREIF DESCRIPTION OF THE FIGURES

The above and other objects, features and advantages of the Invention will be made apparent from the following description of the preferred embodiments, with reference to the accompanying drawings, in which FIG. 1 is a transverse cross-section of the heat-resistant electrical wire according to the Invention, manufactured from a non-coated electrical wire;

FIG. 2 is a transverse cross-sectional of the heat-resistant electrical wire according to the Invention, manufactured from an electrical wire coated with an insulating layer; and FIG. 3 is a schematic diagram or the process for applying a coating of the Inventive Polymers.

DETAILED DESCRIPTION OF THE PREFERRED EMBODIMENTS

The expression ceramic coating or layer used in the present Invention is to be taken in a broad sense to include not only a film entirely composed of ceramic, but also e.g. metallic films in which only the surface is formed into ceramic.

Figure 1:
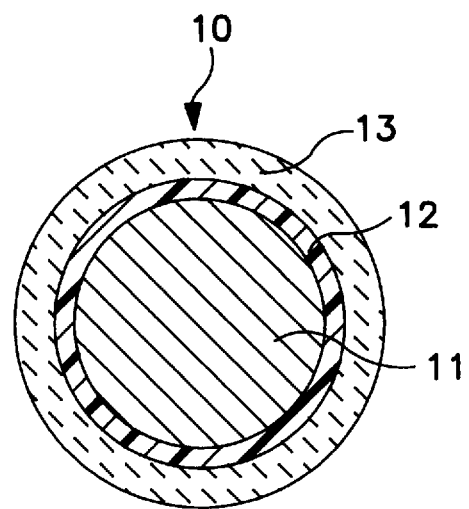

The benzimidazole-based polymers of the Invention are designated by the acronym PBI. In FIG. 1, heat-resistant electrical wire 10 has exposed electrically conductive wire 11 coated with film 12 made of PBI. PBI film 12 is then coated with ceramic film 13. PBI film 12 confers a high heat resistance, and ceramic film 13 enables PBI film 12 to maintain this quality by protecting it from air contact and subsequent air oxidation.

Heat-resistant electrical wire 10 is produced by dissolving PBI in a solvent, thereby preparing a PBI varnish solution. When the PBI has a low degree of polymerization, a radical-polymerization initiating agent is also included, usually during the varnish solution preparation. Solvents for varnish solution preparation include basic solvents such as dimethylacetamide (DMA), dimethylformamide (DMF), pyridine, or a hydrogen-bonding shielding solvent such as dimethylsulfoxide (DMSO), and the like. The PBI concentration may vary from 1% to 80%, but is preferably in the range from 5% to 40% by weight. The radical-polymerization initiating agents may include, for example, benzoyl peroxide, lauroyl peroxide, di-t-butyrophthalate peroxide, azo-bis-isobutyronitrile (AIBN), phenylazoaryl-sulfonic acid, N-nitroso-N-acyl compounds, etc.

The radical-polymerization initiator is added to the PBI solution to neutralize polymerization-inhibiting agents that may be initially added to a varnish solvent such an DMA, and also to induce a stacking of PBI molecules. Therefore, this addition promotes cross-linking and eventually further polymerization of PBI, Which occurs during baking and forms a strong PBI film.

Figure 3:
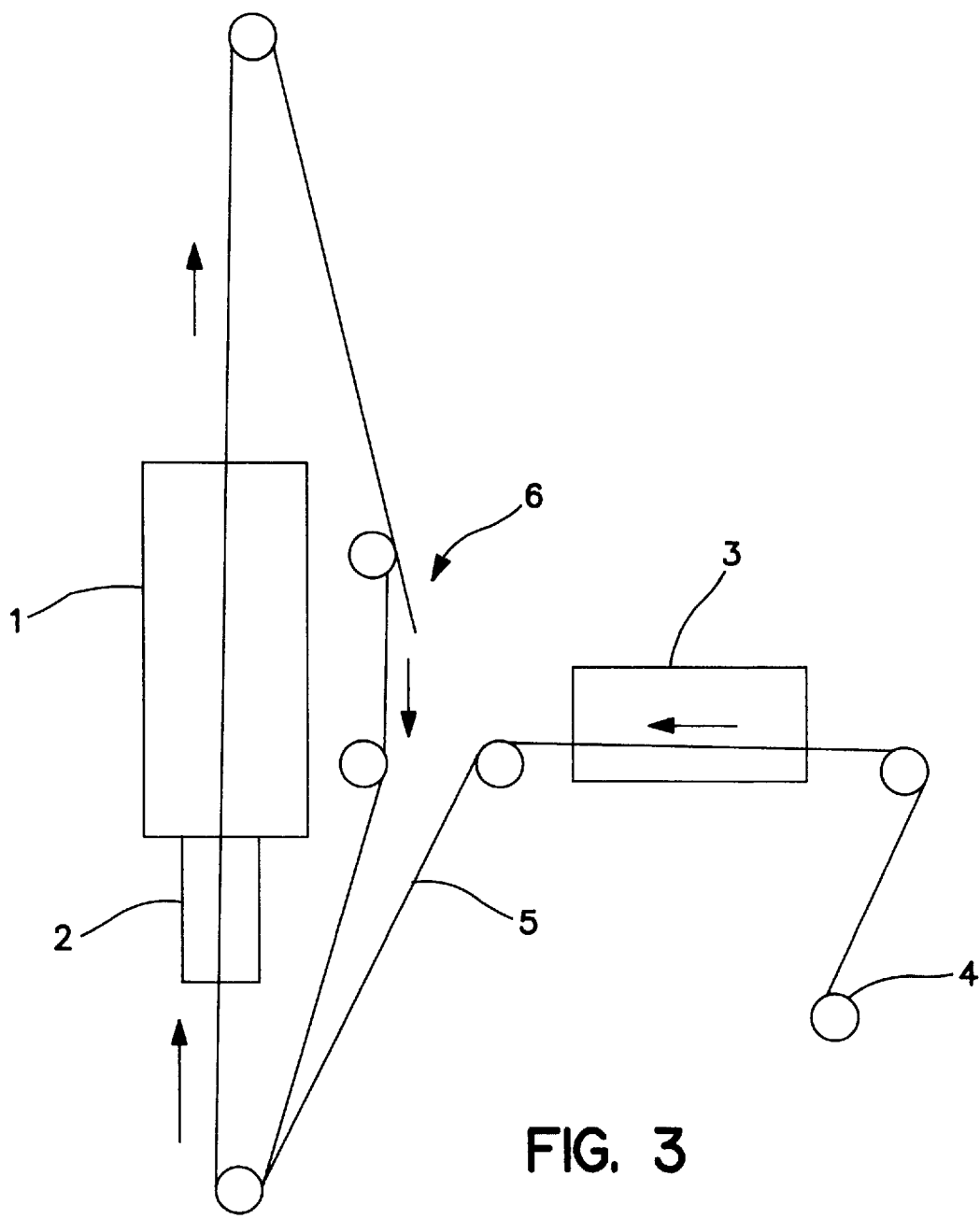

The PBI varnish solution is applied to the surface of bare electrical wire 11 and is baked thereon. The coating formation, followed by repetition thereof, causes cross-linking and/or further polymerization of the base polymers PBI. FIG. 3 snows an apparatus for implementing the above process comprising baking furnace 1, applying unit 2, continuous annealing furnace 3, and coil winding unit 4. In this device, wire 5, such as an electrical conductor or a coated electrical wire, is initially wound on coiling unit 4. It is then uncoiled therefrom, annealed in continuous annealing furnace 3, sent to applying unit 2 to receive the varnish solution, and then transported to baking furnace 1 where the varnish is baked onto the wire.

Further, varnish-baked wire 5 is processed repeatedly through applying unit 2 and baking furnace 1, whereby the coating is reinforced. According to general handling processes, when bare electrical wire 11 has a diameter of less than 0.6 mm, the applying unit may be a horizontal furnace while, when the diameter is larger than 0.6 mm, a vertical furnace may be used. This principle may be applied to the PBI coating and baking of the present Invention by choosing the type of furnace depending on the circumstances. It is possible to appropriately modify the application frequency, baking temperature, application speed, etc. according to the type of varnish to be baked, the type of baking furnace used, etc. The application frequency may vary from once to several hundred times, but is more appropriately in the range from 2 to 20 times. The baking temperature may be chosen between room temperature and 1,000° C., but in preferably in the range of 500° C. to 800° C.

As has been described, the electrical wire is first coated with PBI film 12, then the outer surface of the film is further coated with the ceramic material, thereby forming ceramic film 13. The ceramics used in the Invention are comprised of refractory materials having the Formula II. In the case of common industrial refractories, M in Formula II is Al, Ca, Cr, Mg, Si, Zr, etc. or mixtures thereof to form a mono-or mixed metal oxide. Basic refractories of Formula II, wherein k=1 and l=1, include magnesia, dolomite, calcium oxide, and zinc oxide. Acid refractories of Formula II wherein k=1 and l=2, include silica ($SiO_2$), zirconia, titanium oxide, and tin oxide.

Neutral refractories of Formula II, wherein k=2 and l=3, include alumina-, chromium oxide, or spinel-type refractories, which contain $Al_2O_3$ or $Cr_2O_3$ as an essential component. The mixed oxides of these materials may also be used as the ceramic, including natural products such as mica. In practice, these oxides are combined with non-oxidized metals and the metals may be oxidized only on their surfaces; however, this does not impede their function as refractory materials.

The ceramic of Formula II may be made into a powder-paste varnish by using a silicone-type binder. The binder contains abundant organic groups such as methyl, so that the adhesion of the varnish to the PBI layer is improved. Moreover, ceramic particles in the ceramic powder are modified to form a scale-like structure, so that the surface is increased in relation to the thickness and the coating obtained becomes more impervious to water and air.

In the above embodiment, the ceramic adhesion to the PBI coating is improved and the overall coating adhesivity to the conductor wire is good. However, compared with the breakdown voltage of about 5.0 kV for a single PBI coating, the corresponding figure after ceramic coating did not exceed 1.5 kV. This seems to be caused by a surface electrical current flow occurring on the ceramic coating. In order to suppress this current flow, the ceramic coating on the end portion of the PBI and ceramic coated wire was removed by solvent. After this treatment, the breakdown voltage of the ceramic coating was greatly improved and ranged from 3.4 to 4.6 kV.

A thixotropy-enhancing agent, added to the varnish in order to improve paintability, caused the coating to be partially eccentric. To avoid this phenomenon, the orientation tendency of the varnish was increased by conferring a more non Newtonian nature thereto. To dilute the varnish, xylene, toluene, etc. were used depending on the specific use.

The silicone binder comprises, as base polymers, organopolysiloxanes wherein siloxane bonding Si—O—Si constitutes the polymer skeleton and organic groups are bonded to the silicon atoms. The ceramic of formula $M_kO_l$, having a high melting temperature is then dispersed in this silicone binder. Baking and adhering this dispersed mixture on an electrical wire gives a highly flexible wire.

The baked electrical wire is transformed by coiling or other operations and allowed to stand at a temperature above 400° C. The silicone resin and ceramic are then completely sintered to give a highly heat-resistant, heat-cycle resistant, and anti-wear ceramic sinter. Normally, a ceramic-type varnish prepared with a silicone binder does not adhere well to a metallic conductor. The sole possible technology known to date was therefore to extrude a mixture of silicone binder and dispersed ceramic on the conductor. The dispersed ceramic can serve as a pigment. Typical examples of coloring pigment used in silicone-type paints are as follows:

black: $Cr_2O_3$, $NiO$, $MnO_2$, $Fe_3O_4$, etc. and mixtures thereof which are baked at 700° C. or above;

white: titanium oxide ($TiO_2$) and zinc white (ZnO);

red rouge: ($Fe_2O_3$) which shows different colors depending on the baking conditions;

yellow: titanium yellow ($TiO.NiO.Sb_2O_3$) which shows a high resistance to acid and alkali;

green: chromium oxide ($Cr_2O_3$) which is highly resistant to heat, acid, and alkali, and cobalt green (CoO, ZnO) which has a high heat resistance.

blue: cobalt blue ($CoO.nAl_2O_3$) which is resistant up to 500° C.;

silver: Alumina ($Al_2O_3$).

Processes for preparing such ceramic coatings include the PVD, CVD, extrusion, coating-baking methods, etc. In the following, only the coating-baking method and the extrusion method are described, but the other methods may also be used for the purpose of the Invention.

In the ceramic coating-baking method, which is the simplest of the above-mentioned methods, application of the ceramic paint on a bare or insulated electric wire conductor is usually effected by repeated painting and adhering by baking, as for enamel painting. In the ceramic paint, ceramic particles are dispersed and suspended in the silicone binder. The silicone binder, containing a large amount of organic groups, such as methyl groups, adheres properly to the electrical conductor.

According to general handling processes, when the electrical wire has a diameter less than 0.6 mm, the applying unit may be a horizontal furnace while, when the diameter is larger than 0.6 mm, a vertical furnace may be used. The application frequency, baking temperature, application speed, etc. may also be appropriately modified, depending on the type of paint to be baked and the type of baking furnace, as in the case of PBI baking.

The application frequency in the present Invention may vary from once to several hundred times, but is more appropriately in the range or 2 to 20 times. The baking temperature may be between room temperature and 1,000° C., but is preferably between 350° C. and 800° C. The application speed (line speed) may be from 0.1 m/min to 1,000 m/min, but is preferably from 2 m/min to 200 m/min. The appropriate solvents for the varnish of the present Invention include non-polar solvents such as toluene, xylene, hexane, or a hydrogen-bonding shielding solvent such as dimethylsulfoxide (DMSO) or the like. The concentration of ceramic in the varnish may be from 1% to 80% by weight, but is preferably from 5% to 40%. To improve the appearance of the wire, a thixotropy-enhancing agent may be added to the ceramic paint.

In the extrusion coating method, the composition of the ceramic paste to be used will vary depending on extrusion conditions. When an aluminium-based ceramic is used, the base medium is prepared by mixing alumina powder and a flux consisting of, for example, by weight, 32.6% talc, 43.4% kaolin, and 24.0% felspar. To this is added a binder containing asphalt, a synthetic lacquer, stearic acid, pine oil, naphtha, pine tar, glycerin, and a thermosetting resin such as bakelite.

According to one embodiment, a resin, lacquer and alumina powder are mixed for 10 minutes to obtain a first mixture. The above-mentioned flux is then added to the first mixture, and further mixed for about 5 minutes. To the resulting mixture, are added stearic acid, pine oil, naphtha, and glycerin, which are mixed for about 20 minutes to obtain a preparation. The preparation is weighed, charged into a cylinder heated at 118° to 123° C., and injected into a mold, kept at 40° C. by water-cooling, under a pressure of 910 to 1,260 kg/cm². The resultant coating is placed under pressure for 3 seconds, removed from the mold, smoothed by a high-speed grinder to remove burrs, and dried over 5 days at a temperature gradually increasing from 65° C. to 320° C.

In another embodiment, a thermoplastic resin such as polyvinylbutyral or polypropylene;, a solvent such as methylethylketone, ethyl alcohol, or n-butyl alcohol; a plasticizing agent such as di-n-butyl phthalate;, and an animal oil as dispersing agent are added to the base medium. The quantity of these compounds to be used varies depending on the type or particle size of the starting powder. A preparation may contain, by weight, for example, 100 parts base medium, 5 to 15 parts resin as binder agent, 40 to 60 parts solvent, about 10 parts plasticizer, and about 1 part animal oil. These components are mixed as described for the previous embodiment to obtain a mixture paste. The paste is injected at 130° to 160° C. into a mold having a temperature of 40° to 60° C. under a pressure of 200 to 600 kg/cm². The extrusion rate (line speed) may vary from 1 m/min to 1,000 m/min, but is preferably between 10 m/min and 200 m/min. The extrusion temperature may be chosen appropriately between room temperature and 350° C.

Specific embodiments of the present Invention are shown hereinafter. Percentages indicated are % by weight unless otherwise stated.

EXAMPLE 1

A nickel-chromium wire having a diameter of 0.5 mm is soaked or dipped in a varnish solution consisting of 30 parts of polymer PBI and 70 parts of solvent DMA. The varnish solution is applied to the wire. The varnish is baked onto the wire at a line speed of 20 m/min at 350° C. The above procedure is repeated 8 times to obtain a PBI film-coated, nickel chromium wire.

An alumina-varnish solution is prepared by dispersing alumina, partially mixed with aluminium metal, in a silicone binder. More specifically, the silicone binder contains, as base polymers, organopolysiloxanes where siloxane bonding Si—O—Si constitutes the polymer skeleton and organic groups are bonded to the silicon atoms. Then a ceramic of formula $M_kO_l$ having a high melting temperature is dispersed in these base polymers. The alumina varnish solution prepared from the above silicone binder may contain 20% alumina, 15% toluene, and 15% xylene, the rest being an organopolysiloxane polymer.

The above PBI film-coated wire was dipped in the alumina varnish solution, so that the solution was applied to the surface of the PBI film. The varnish was then baked onto the PBI coated wire at a line speed of 10 m/min at 350° C. The above procedure was repeated 4 times to obtain a nickel-chromium wire successively coated with PBI, and alumina-organopolysiloxane.

EXAMPLE 2

A nickel-chromium wire having a diameter of 0.5 mm is soaked in a varnish solution consisting of 30 parts polymer PBI and 70 parts solvent DMA, and the varnish solution is applied to the wire. The varnish is baked thereon at a line speed of 20 m/min at 350° C. The above procedure is repeated 8 times to obtain PBI film-coated, nickel-chromium wire.

A base medium is prepared by mixing 85.4% fine alumina powder with 14.6% flux consisting of 32.6% of talc, 43.4% of kaolin, and 24.0% felspar. To this is added a binding agent containing asphalt, a synthetic lacquer, stearic acid, pine oil, naphtha, pine tar, glycerin, and a thermosetting resin ouch as bakelite. The mixture paste thus obtained is extruded around the PBI-coated nickel-chromium wire at an extrusion speed (line speed) of 10 m/min at 200° C. After solvents are distilled away, the resultant coating is baked at 400° C. or above and then cooled to obtain a nickel-chromium wire successively coated with a PBI and alumina.

EXAMPLE 3

An oxygen-free copper wire having a diameter of 0.5 mm is soaked in a varnish solution consisting of 30 parts polymer PBI and 70 parts solvent DMA, the varnish solution further comprising 0.1 parts by weight of AIBN to 99.9 parts by volume of solvent, and the varnish solution is applied to the wire. The varnish is baked onto the wire at a line speed of 50 m/min at 600° C. The above procedure is repeated 8 times to obtain a PBI film-coated copper wire.

The PBI-coated copper wire is dipped in an aluminum-containing varnish solution prepared as indicated in Example 1, so that the solution is applied to the surface of PBI-coated wire. The varnish is then baked onto the surface at a line speed of 10 m/min at 400° C. The above procedure is repeated 3 times to obtain a copper wire successively coated with PBI and an alumina-organopolysiloxane.

EXAMPLE 4

A nickel-plated copper wire having an external diameter of 0.5 mm is soaked in a varnish solution consisting or 30 parts polymer PBI and 70 parts solvent DMA, the varnish solution further comprising 0.1 parts by weight of AIBN initiator to 99.9 parts by volume of solvent, and the varnish solution is applied to the wire. The varnish is baked onto the wire at a line speed of 50 m/min at 600° C. The above procedure is repeated 8 times to obtain a nickel-plated copper wire coated with a PBI film.

An extrusion paste is prepared as indicated in Example 2. The paste thus obtained is extruded around the PBI coated nickel-plated copper wire at a speed (line speed) of 10 m/min at 200° C. After solvents are distilled away, the extruded wire coating is baked at 400° C. or above and then cooled to obtain a nickel-plated copper wire, successively coated with a PBI and alumina.

EXAMPLE 5

A nickel-plated copper wire having an external diameter of 0.5 mm is soaked in a varnish solution consisting of 30 parts polymer PBI, 60 parts solvent DMA and 10 parts solvent DMSO, the varnish solution further comprising 0.1% parts by weight of AIBN initiator to 99.9 parts by volume of solvent, and the varnish solution is applied to the wire. The varnish is then bated onto the wire at a line speed of 20 m/min at 600° C. The above procedures is repeated 8 times to obtain a nickel-plated copper wire coated with PBI film.

An extrusion paste is prepared an indicated in Example 2. The pasta thus obtained is extruded around the PBI coated nickel-plated copper wire at an extrusion speed (line speed) of 20 m/min at 300° C. After solvents are distilled away, the extruded wire is baked at 400° C. or more and then cooled to obtain a nickel-plated copper wire, successively coated with PBI and alumina.

EXAMPLE 6

An oxygen-free copper wire having a diameter of 0.36 mm is soaked in a varnish solution consisting of 20 parts polymer PBI and 80 parts solvent DMA, whereby the varnish solution is applied to the wire. The varnish is baked onto the wire at a line speed of 10 m/min at 500° C. The above procedure is repeated 10 times to obtain a PBI coated oxygen-free copper wire The PBI coated oxygen-free copper wire thus prepared is soaked in an alumina varnish solution prepared as indicated in Example 1, thus applying the varnish solution to the PBI coating. The varnish solution is baked onto the PBI coating at a line speed of 10 m/min at 400° C. The above procedure is repeated 3 times to obtain an oxygen-free copper wire, successively coated with a PRT and an alumina-organopolysiloxane.

EXAMPLE 7

A nickel-plated copper wire having an external diameter of 1.5 mm is soaked in a varnish solution consisting of 55 parts polymer PBI and 45 parts solvent DMA, whereby the varnish solution is applied to the wire. The varnish is baked onto the wire at a line speed of 60 m/min at 700° C. The above procedure is repeated 20 times to obtain a PBI coated nickel-plated copper wire.

The PBI coated nickel-plated copper wire is then soaked in a varnish solution containing 20% tin oxide, 20% toluene, and 20% xylene, the rest being organopolysiloxane polymer. The varnish thus coated is baked onto the PBI coating at a line speed of 15 m/min at 450° C. The above procedure is repeated 4 times to obtain a nickel-plated copper wire, successively coated with PBI and tin oxide-organopolysiloxane.

EXAMPLE 8

A nickel-plated copper wire having an external diameter of 2.5 mm is soaked in a varnish solution consisting of 65 parts polymer FBI and 35 parts solvent DMA, whereby the varnish solution is applied to the wire. The varnish is baked thereon at a line speed of 30 m/min at 600° C. The above procedure is repeated 15 times to obtain a PBI coated nickel plated copper wire.

The PBI coated nickel-plated copper wire is then soaked in an alumina varnish solution containing 20% alumina, 15% toluene, and 15% xylene, the rest being organopolysiloxane polymer. The varnish is baked onto the PBI coating at a line speed of 10 m/min at 350° C. The above procedure is repeated 3 times to obtain a nickel-plated copper wire, successively coated with PBI and alumina-organopolysiloxane.

EXAMPLE 9

A nickel copper alloyed wire having a diameter of 1.5 mm is soaked in a varnish solution consisting of 55 parts polymer PBI and 45 parts solvent DMA, and the varnish solution is applied to the wire. The varnish Is baked onto the wire at a line speed of 30 m/min at 500° C. The above procedure is repeated 20 times to obtain a PBI coated nickel-copper alloyed wire.

The PBI coated nickel-plated copper wire is then soaked in a varnish solution containing 18% silver oxide, 15% toluene, and 10% xylene, the rest being organopolysiloxane polymer. The varnish is baked onto the PBI coating at a line speed of 17 m/min at 450° C. The above procedure is repeated 4 times to obtain a nickel-copper alloyed wire, successively coated with a PBI and a silver oxide-organopolysiloxane.

EXAMPLE 10

An oxygen-free copper wire having a diameter of 0.36 mm is prepared. Copolymer ethylene-tetrafluaroethylene (ETFE) is extruded therearound at a rate of 15 m/min at 330° C. to obtain an oxygen-free copper wire coated with ETFE. The wire thus obtained is soaked in a varnish solution consisting of 20 parts PBI and 80 parts DMA, and the varnish solution is applied to the ETFE coating. The varnish is then baked onto the wire at a line speed of 10 m/min at 500° C. The above procedure is repeated 10 times to obtain an oxygen-free copper wire, successively coated with ETFE and PBI.

The wire thus prepared is further soaked in an alumina varnish solution prepared as indicated in Example 1, and the alumina varnish solution is applied to the PBI surface. The varnish is then baked onto the wire at a line speed or 10 m/min at 400° C. The procedure is repeated 3 times to obtain an oxygen-free copper wire, successively coated with ETFE, PBI, and alumina-organopolysiloxane. The oxygen-free copper wire, successively coated with ETFE, PBI, and alumina-organopolysiloxane, has a high heat resistance and can be used at temperatures above 350° C. It also has a high dielectric breakdown value.

EXAMPLE 11

A nickel-chromium wire having a diameter of 0.5 mm is soaked in a varnish solution consisting of 30 parts polymer PBI and 70 parts solvent DMA, and the varnish solution is applied to the wire. The varnish is baked onto the wire at a line speed of 20 m/min at 350° C. The above procedure in repeated 8 times to obtain a PBI-coated nickel-chromium wire.

A copolymer of tetrafluoroethylene and hexafluoropropylene (hereinafter FEP) is extruded around the PBI-coated wire under the following conditions: reduction rate 16.3%, drawing balance (speed balance between outer and inner tube surfaces when coating a wire by tubing extrusion) 1.0, extrusion ratio 10 m/min, cylinder temperature 260° to 320° C. The copolymer was then cooled. A PBI-coated nickel-chromium wire, further coated with a fluorine-rubber type FEP coating is thus obtained.

Each of the above-prepared samples was submitted to physical testing. The results obtained are represented in Tables 1 and 2. As is seen in Tables 1 and 2, all the samples show a high heat resistance and a high dielectric breakdown value.

As regards the nickel-chromium wire illustrated in Example 1, an ageing test is effected on the two-layer (PBI and alumina-organopolysiloxane)-coated wire and the one-layer (PBI)-coated wire, at 300° C. for 24 hours under atmospheric conditions. Table 3 shows the results of the test. In the nickel-chromium wire coated merely with the PBI-film, the initial dielectric breakdown value (in kV) of 2.1 decreases to 1.9 after ageing. In the case of the PBI and alumina-organopolysiloxane coated nickel-chromium wire, the alumina-organopolysiloxane coating deteriorates after the ageing. However, when the alumina-organopolysiloxane coating is stripped off, the underlying PBI film showed its initial dielectric breakdown value (kV) of 2.2 is maintained. The same tendency is observed in Examples 2 to 10.

Table 4 shows a comparative ageing test effected on the is ceramic-finished, PBI-coated wire of Example 1 and on the fluorine-rubber finished, PBI-coated wire of Example 11. As can be seen, the product of Example 1 shows a higher breakdown voltage value than that of Example 11.

Figure 2:
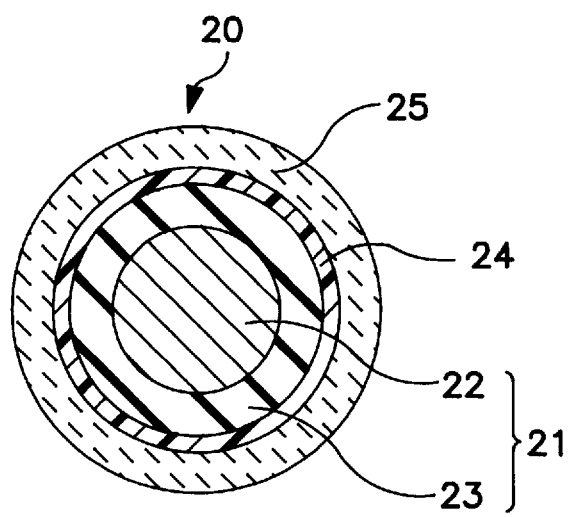

Examples 1 to 9 are concerned with bare electric wire 11 coated with PBI coating 12 and further coated with ceramic coating 13, all as shown in FIG. 1. However, as shown in FIG. 2, the starting wire may be already coated wire 21 comprised of main wire 22 and insulating coating 23. This wire 21 may be coated with PBI 24 and further with ceramic coating 25. Such a product is illustrated in Example 10, showing generally improved physical properties.

In the present Invention, the use of the above-mentioned film or coating is not limited to heat-resistant electrical wires. The same two-layer structure may be used more generally as a heat-resistant insulation material independently of such a wire. This material may comprise: a first layer consisting of PBI, having a first face adapted to confront a substrate; and a second layer consisting of ceramic, covering the second face of the first layer. In the heat proof electric wires or heat-resistant insulating materials according to the Invention, even when they are used under very severe conditions, the FBI coating or layer may be prevented from direct contact with air, whereby the advantageous features thereof, such as heat resistance, are retained intact.

While only a limited number or embodiments of the present Invention has been expressly disclosed, it is understood that various omissions, substitutions, and changes in the form and details of the claimed heat-resistant wire and insulating material may be made by those skilled in the art without departing from the spirit of the Invention. It is intended, therefore, that the Invention be limited only as indicated by the scope of the claims appended thereto.

TABLE 1

Dimensions and performance of the samples obtained in Example 1 to 9

| Characteristic | Example 1 | Example 2 | Example 3 | Example 4 | Example 5 | Example 6 | Example 7 | Example 8 | Example 9 |
|---|---|---|---|---|---|---|---|---|---|
| PBI-finished wire, outer diameter (mm) | 0.516 | 0.516 | 0.516 | 0.516 | 0.511 | 0.401 | 1.518 | 2.520 | 1.519 |
| PBI coating thickness (mm) | 0.008 | 0.008 | 0.008 | 0.008 | 0.0055 | 0.0205 | 0.009 | 0.010 | 0.008 |
| Ceramic-finished wire, outer diameter (mm) | 0.530 | 0.756 | 0.526 | 0.716 | 0.731 | 0.411 | 1.532 | 2.532 | 1.533 |
| Ceramic coating thickness (mm) | 0.007 | 0.120 | 0.005 | 0.100 | 0.110 | 0.005 | 0.007 | 0.006 | 0.007 |
| PBI-finished, dielectric breakdown voltage (kV)* | 2.1 | 2.1 | 2.1 | 2.1 | 2.2 | 3.5 | 2.2 | 3.5 | 2.1 |
| Ceramic-finished, dieletric breakdown voltage (kV)* | 2.2 | 5.0 | 3.1 | 2.2 | 2.4 | 3.7 | 3.0 | 4.0 | 3.5 |
| Thermal Shock** | OK | OK | OK | OK | OK | OK | OK | OK | OK |
| Wear resistance indicator*** | 1,240 | 2,140 | 1,330 | 2,040 | 1,940 | 1,350 | 1,450 | 1,350 | 1,400 |

*Voltage at breakdown, attained by increasing the voltage at a rate of 500 V/min using alternating current.
**Cracking evaluated after the sample was elongated by 20%, maintained in this state at 220° C. for 30 minutes, and returned to room temperature.
***Reciprocation counts attained before a reclorocating blade under a load of 4N traverses through a coating (standard test, JASO, D611).

TABLE 2

Dimensions and performance of the samples obtained in Examples 10 and 11.

| Characteristic | Example 10 | Characteristic | Example 11 |
|---|---|---|---|
| Fluorine-rubber finished wire, outer diameter (mm) | 0.66 | FBI-finished wire, outer diameter (mm) | 0.516 |
| Fluorine rubber coating thickness (mm) | 0.150 | PBI coating thickness (mm) | 0.008 |
| PBI-finished wire, outer diameter (mm) | 0.70 | Fluorine-rubber finished wire, outer diameter (mm) | 0.756 |
| PBI coating thickness (mm) | 0.020 | Fluorine rubber coating thickness (mm) | 0.120 |
| Ceramic-finished wire, outer diameter (mm) | 0.71 | PBI-finished, dielectrical breakdown voltage (kV)* | 2.1 |
| Ceramic coating thickness (mm) | 0.005 | Fluorine-rubber finished, dielectric breakdown voltage (kV)* | 10.0 |
| PBI-finished, dielectric breakdown voltage (kV)* | 7.0 | Thermal Shock** | OK |
| Ceramic-finished, dielectric breakdown voltage (kV)* | 7.5 | Wear resistance indicator*** | 1,040 |
| Thermal Shock** | OK | | |
| Wear resistance indicator*** | 1,350 | | |

Marks *,  and * have the same meaning as in Table 1.

TABLE 3

Ageing test-effected on the samples obtained in Example 1

| Dielectric breakdown (kV)* | PBI- and ceramic-coatings finished | PBI-coating finished |
|---|---|---|
| Before ageing | 2.2 | 2.1 |
| After ageing** | 2.2 | 1.9 |

*Measured on the PBI coating
**Aged at 300° C. for 24 h

TABLE 4

Ageing test effected on the samples obtained in Examples 1 and 11

| Dielectric breakdown (kV)* | Example 1 | Example 11 | PBI-coating finished |
|---|---|---|---|
| Before ageing | 2.1 | 2.1 | 2.1 |
| After ageing** | 2.1 | 0.5 | 0.3 |

*Measured on the PBI coating
**Aged at 350° C. for 24 h

What we claim is:

1. A heat-resistant electrical wire comprising an element including an electrically conductive part, a first layer and a second layer, in that order;

said first layer containing a benzimidazole-based polymer and surrounding said element; and an insulating second layer on said first layer and containing a ceramic material, said second layer being securely fixed to said first layer.

2. The electrical wire of claim 1 wherein said second layer contains a silicon containing compound.

3. The electrical wire of claim 1 wherein said polymer is a product of the reaction or a plurality of monomers of Formula I

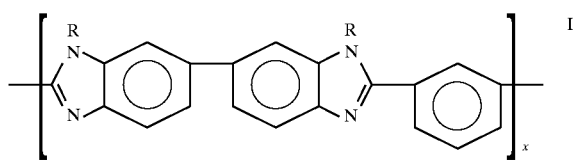

wherein each R is selected from the group consisting of hydrogen and alkyl having 1 to 4 carbon atoms, and x is an integer of at least 5 and is selected to yield solvent-soluble polymers.

4. The electrical wire of claim 1 wherein said ceramic material is represented by Formula II $$M_k O_l \qquad\qquad II$$

wherein M is a metal, k is 1 or 2, and l is 1, 2, or 3.

5. The electrical wire of claim 3 wherein said ceramic material is represented by Formula II $$M_k O_l \qquad \text{II}$$

wherein M is a metal, k is 1 or 2, and l is 1, 2, or 3.

6. The electrical wire of claim 1 wherein said part is an electrical wire.

7. The electrical wire of claim 6 wherein said electrical wire is coated with an insulating layer.

* * * * *